(12) United States Patent
Iwase et al.

(10) Patent No.: US 10,330,910 B2
(45) Date of Patent: *Jun. 25, 2019

(54) IMAGE ACQUISITION DEVICE AND METHOD AND SYSTEM FOR ACQUIRING FOCUSING INFORMATION FOR SPECIMEN

(71) Applicant: HAMAMATSU PHOTONICS K.K., Hamamatsu-shi, Shizuoka (JP)

(72) Inventors: Fumio Iwase, Hamamatsu (JP); Masatoshi Okugawa, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 82 days.

This patent is subject to a terminal disclaimer.

(21) Appl. No.: 14/786,576

(22) PCT Filed: Apr. 21, 2014

(86) PCT No.: PCT/JP2014/061180
§ 371 (c)(1),
(2) Date: Oct. 23, 2015

(87) PCT Pub. No.: WO2014/175219
PCT Pub. Date: Oct. 30, 2014

(65) Prior Publication Data
US 2016/0077322 A1 Mar. 17, 2016

(30) Foreign Application Priority Data
Apr. 26, 2013 (JP) ................................. 2013-094079

(51) Int. Cl.
*G02B 21/00* (2006.01)
*G02B 21/36* (2006.01)
(Continued)

(52) U.S. Cl.
CPC ............. *G02B 21/365* (2013.01); *G02B 7/36* (2013.01); *G02B 21/02* (2013.01); *G02B 21/244* (2013.01);
(Continued)

(58) Field of Classification Search
CPC ... G09B 9/00; H04N 7/18; H04N 7/00; G01B 11/24; G01B 11/00; G02B 21/00;
(Continued)

(56) References Cited

U.S. PATENT DOCUMENTS 6,677,565 B1   1/2004   Wahl et al.
7,518,652 B2   4/2009   Olson et al.
(Continued)

FOREIGN PATENT DOCUMENTS

CN   101031837   9/2007
CN   102645160   8/2012
(Continued)

OTHER PUBLICATIONS

International Preliminary Report on Patentability dated Nov. 5, 2015 for PCT/JP2014/055987.
(Continued)

*Primary Examiner* — Maryam A Nasri
(74) *Attorney, Agent, or Firm* — Drinker Biddle & Reath LLP

(57) ABSTRACT

In an image acquisition device, an optical path difference generating member can form an optical path length difference of a second optical image without splitting light in a second optical path. This can suppress the quantity of light required for the second optical path to obtain information of the focal position, whereby a quantity of light can be secured for a first imaging device to capture an image. The image acquisition device synchronizes the movement of a predetermined part of a sample within a field of an objective lens
(Continued)

with rolling readout such that each pixel column of a second imaging device is exposed to an optical image of the predetermined part in the sample.

12 Claims, 11 Drawing Sheets

(51) Int. Cl.
  *G02B 7/36* (2006.01)
  *G02B 21/24* (2006.01)
  *H04N 5/232* (2006.01)
  *G02B 21/02* (2006.01)
  *G02B 21/26* (2006.01)

(52) U.S. Cl.
  CPC ........... *G02B 21/26* (2013.01); *G02B 21/361* (2013.01); *G02B 21/367* (2013.01); *H04N 5/23212* (2013.01)

(58) Field of Classification Search
  CPC .. G02B 21/36; G06T 7/00; G06T 5/50; G06T 7/00; G06T 5/00
  See application file for complete search history.

(56) References Cited

U.S. PATENT DOCUMENTS

| | | | |
|---|---|---|---|
| 2003/0136980 A1* | 7/2003 | Lin | H01L 27/14625 257/215 |
| 2004/0051030 A1* | 3/2004 | Olszak | G06T 1/0007 250/208.1 |
| 2005/0258335 A1* | 11/2005 | Oshiro | G02B 21/244 250/201.3 |
| 2005/0270611 A1 | 12/2005 | Oshiro et al. | |
| 2006/0017001 A1 | 1/2006 | Donders et al. | |
| 2007/0206097 A1* | 9/2007 | Uchiyama | G02B 21/367 348/207.99 |
| 2008/0049309 A1 | 2/2008 | Tanikawa et al. | |
| 2008/0223839 A1* | 9/2008 | Maruyama | B23K 26/03 219/121.83 |
| 2009/0073305 A1 | 3/2009 | Yuba et al. | |
| 2010/0155577 A1* | 6/2010 | Kiesel | G01N 15/1056 250/208.2 |
| 2014/0152793 A1* | 6/2014 | Staker | G02B 21/361 348/79 |
| 2014/0168640 A1* | 6/2014 | Gouch | G02B 21/245 356/123 |
| 2015/0022651 A1 | 1/2015 | Wu | |
| 2015/0309298 A1* | 10/2015 | Nagai | G02B 7/28 359/363 |
| 2016/0004062 A1 | 1/2016 | Dixon | |

FOREIGN PATENT DOCUMENTS

| | | |
|---|---|---|
| CN | 102687056 | 9/2012 |
| EP | 1 830 217 | 9/2007 |
| EP | 1 865 354 | 12/2007 |
| EP | 2 490 069 | 8/2012 |
| JP | H08-320430 A | 12/1996 |
| JP | 2006-343573 A | 12/2006 |
| JP | 2008-507719 A | 3/2008 |
| JP | 2009-069197 A | 4/2009 |
| JP | 2009-522604 A | 6/2009 |
| JP | 2010-256530 A | 11/2010 |
| JP | 2011-081211 | 4/2011 |
| JP | 2012-042970 A | 3/2012 |
| JP | 2012-073285 A | 4/2012 |
| JP | 2012-108184 A | 6/2012 |
| JP | 2012-138068 A | 7/2012 |
| JP | 2012-212155 A | 11/2012 |
| WO | WO-2005/114293 A1 | 12/2005 |
| WO | WO-2006/008637 A1 | 1/2006 |
| WO | WO-2007/079397 A2 | 7/2007 |
| WO | WO 2007/095090 | 8/2007 |
| WO | WO 2010/048584 | 4/2010 |
| WO | WO 2011/080670 | 7/2011 |
| WO | WO 2011/145016 | 11/2011 |
| WO | WO 2011/161594 | 12/2011 |
| WO | WO-2012/002893 A1 | 1/2012 |
| WO | WO 2013/017855 | 2/2013 |

OTHER PUBLICATIONS

International Preliminary Report on Patentability dated Nov. 5, 2015 for PCT/JP2014/055988.
International Preliminary Report on Patentability dated Nov. 5, 2015 for PCT/JP2014/061180.
International Preliminary Report on Patentability dated Nov. 5, 2015 for PCT/JP2014/061182.
U.S. Office Action dated May 18, 2017 that issued in U.S. Appl. No. 14/786,581 including Double Patenting Rejections on pp. 3-7.

* cited by examiner

IMAGE ACQUISITION DEVICE AND METHOD AND SYSTEM FOR ACQUIRING FOCUSING INFORMATION FOR SPECIMEN

TECHNICAL FIELD

The present invention relates to an image acquisition device and a method and system for acquiring focus information of a sample.

BACKGROUND ART

In an image acquisition device for observing a sample such as a tissue cell, when the distance between the sample on the stage and an objective lens is kept constant, irregularities on a surface of the sample may have an out-of-focus region in an image. Therefore, image acquisition devices employing various focusing methods such as a dynamic focus scheme which captures an image of the sample while acquiring focus information and a prefocus scheme which acquires focus information before capturing the image of the sample have been developed.

CITATION LIST

Patent Literature

Patent Literature 1: Japanese Patent Application Laid-Open No, 2012-108184

SUMMARY OF INVENTION

Technical Problem

The above-mentioned conventional device can grasp in-focus regions which are in focus and out-of-focus regions which are out of focus in images captured by an image pickup element. This makes it possible to determine focal position information from the position of the stage at the time when a pixel column corresponding to an in-focus region captures an image. In this technique, however, the position (two-dimensional position) of the sample to be subjected to imaging varies among the pixel columns, whereby focus position information of parts slightly different from each other is acquired in practice. The above-mentioned device is a microscope device which performs imaging at a high magnification of 20× to 40×, for example, and thus has such a small depth of field that the field of the microscope optical system is very small as compared with the sample. Therefore, for acquiring focal position information of the sample as a whole, it is necessary to perform imaging while moving the field of the microscope optical system, which seems to complicate operations in the device that does not drive the stage.

For solving the problem mentioned above, it is an object of the present invention to provide an image acquisition device and a method and system for acquiring focus information of a sample, which can acquire focus information of samples rapidly and accurately.

Solution to Problem

For solving the above-mentioned problem, the image acquisition device in accordance with one aspect of the present invention comprises a stage for mounting a sample; a light source for emitting light to the sample; a lightguide optical system including an objective lens arranged so as to oppose the sample on the stage; an image pickup element for capturing an optical image of the sample guided by the lightguide optical system; a focus calculation unit for calculating focus information of the sample according to image data from the image pickup element; a first drive unit for moving a field position of the objective lens with respect to the sample; a second drive unit for changing a focal position of the objective lens with respect to the sample; and a controller for controlling the image pickup element, first drive unit, and second drive unit; the image pickup element is a two-dimensional image pickup element, adapted to perform rolling readout, having a plurality of pixel columns; the controller synchronizes movement of a predetermined part of the sample within a field of the objective lens caused by the first drive unit with the rolling readout of the image pickup element such that each pixel column of the image pickup element is exposed to an optical image of the predetermined part in the sample, while causing the second drive unit to change the focal position of the objective lens with respect to the sample.

The system for acquiring focus information of a sample in accordance with one aspect of the present invention comprises a stage for holding the sample; a lightguide optical system including an objective lens arranged so as to oppose the sample on the stage; an image pickup element, constituted by a two-dimensional image pickup element, adapted to perform rolling readout, having a plurality of pixel columns, for capturing an optical image of the sample guided by the lightguide optical system; and a focus calculation unit for calculating focus information of the sample according to image data from the image pickup element; the system synchronizes movement of a predetermined part of the sample within a field of the objective lens with the rolling readout of the image pickup element such that each pixel column of the image pickup element is exposed to an optical image of the predetermined part in the sample, while changing a focal position of the objective lens with respect to the sample.

The above-mentioned image acquisition device and system use as an image pickup element a two-dimensional image pickup element which is adapted to perform rolling readout while having a plurality of pixel columns. The rolling readout scheme, which varies image data readout timings among pixel columns and thus may distort images when used for movable objects, is typically employed for objects which stand still. In contrast, by utilizing a delay in image data readout timings among pixel columns in the rolling readout, the above-mentioned image acquisition device and system synchronize the movement of a predetermined part (the same part) of the sample within the field of the objective lens with the rolling readout such that each pixel column of the image pickup element is exposed to an optical image of the predetermined part in the sample. As a consequence, image data from each pixel column includes contrast information obtained when the focal position of the objective lens is changed in the same part of the sample, whereby the focus information can be calculated rapidly and accurately according to the contrast information.

The controller may control the first drive unit such that the predetermined part of the sample is moved at a fixed speed within the field of the objective lens. This can easily control the synchronization of the movement of the predetermined part of the sample within the field of the objective lens with the rolling readout.

The controller may start exposing each pixel column of the image pickup element after a lapse of a predetermined time since the first drive unit starts moving the field position of the objective lens with respect to the sample. This can perform exposure favorably.

A plurality of divisional regions where the image pickup element performs imaging may be set, while the predetermined part of the sample may be set so as to be located in a region other than end parts of the divisional regions. When set in an end part of divisional regions, the predetermined part of the sample is more susceptible to acceleration at the time of being moved by the first drive unit. Therefore, setting the predetermined part of the sample in a region other than end parts of the divisional regions makes it possible to control the synchronization of the movement of the predetermined part of the sample within the field of the objective lens with the rolling readout more easily.

The focus calculation unit may calculate the focus information when the first drive unit moves the field position of the objective lens between the divisional regions. This can acquire the focus information during the movement of the field position of the objective lens, whereby imaging of the sample can be executed rapidly.

The controller may control the first drive unit such that the field position of the objective lens is moved with respect to the sample over at least three divisional regions. Targeting imaging lines over three or more divisional regions can shorten the time required for imaging, while simplifying control.

The image pickup element may be adapted to switch readout directions of the rolling readout. This can extend the degree of freedom in moving directions of the predetermined part of the sample.

Each pixel column of the image pickup element may be constituted by first and second column groups having respective readout directions different from each other. Such a configuration enables the field position of the objective lens to be bidirectionally scanned in a simple structure.

The controller may control the second drive unit such that the focal position of the objective lens with respect to the sample reciprocates in ascending and descending directions during the synchronization of the movement of the predetermined part of the sample with the rolling readout of the image pickup element. This can acquire a greater amount of contrast information at the time when the focal position of the objective lens is changed, whereby the focus information can be calculated more accurately.

The focus calculation unit may produce a focus map according to the calculated focus information. This can accurately produce the focus map.

The focus calculation unit may calculate the focus information for each divisional region. This can accurately produce a focus map of the sample as a whole.

The focusing method for an image acquisition device in accordance with one aspect of the present invention is a focusing method for an image acquisition device comprising a stage for mounting a sample; a light source for emitting light to the sample; a lightguide optical system including an objective lens arranged so as to oppose the sample on the stage; an image pickup element for capturing an optical image of the sample guided by the lightguide optical system; a focus calculation unit for calculating focus information of the sample according to image data from the image pickup element; a first drive unit for moving a field position of the objective lens with respect to the sample; a second drive unit for changing a focal position of the objective lens with respect to the sample; and a controller for controlling the image pickup element, first drive unit, and second drive unit; the method comprising using as the image pickup element a two-dimensional image pickup element, adapted to perform rolling readout, having a plurality of pixel columns; and causing the controller to synchronize movement of a predetermined part of the sample within a field of the objective lens caused by the first drive unit with the rolling readout of the image pickup element such that each pixel column of the image pickup element is exposed to an optical image of the predetermined part in the sample, while making the second drive unit change the focal position of the objective lens with respect to the sample.

The method for acquiring focus information of a sample in accordance with one aspect of the present invention is a method for acquiring focus information of a sample by using a two-dimensional image pickup element, adapted to perform rolling readout, having a plurality of pixel columns; the method comprising synchronizing movement of a predetermined part of the sample within a field of an objective lens with the rolling readout of the image pickup element such that each pixel column of the image pickup element is exposed to an optical image of the predetermined part in the sample, while changing a focal position of the objective lens with respect to the sample; and acquiring the focus information of the sample according to image data from the image pickup element.

The above-mentioned focusing method for an image acquisition device and method for acquiring focus information of a sample use as an image pickup element a two-dimensional image pickup element which is adapted to perform rolling readout while having a plurality of pixel columns. The rolling readout scheme, which varies image data readout timings among pixel columns and thus distorts images when used for moving objects, is typically employed for objects which stand still. In contrast, by utilizing a delay in image data readout timings among pixel columns in the rolling readout, the above-mentioned focusing method for an image acquisition device and method for acquiring focus information of a sample synchronize the movement of a predetermined part (the same part) of the sample within the field of the objective lens with the rolling readout such that each pixel column is exposed to an optical image of the predetermined part in the sample. As a consequence, image data from each pixel column includes contrast information obtained when the focal position of the objective lens is changed in the same part of the sample, whereby the focus information can be calculated rapidly and accurately according to the contrast information.

Advantageous Effects of Invention

The present invention can acquire focus information of samples rapidly and accurately.

DESCRIPTION OF EMBODIMENTS

In the following, preferred embodiments of the image acquisition device and method and system for acquiring focus information of a sample in accordance with the present invention will be explained in detail with reference to the drawings.

Figure 1:
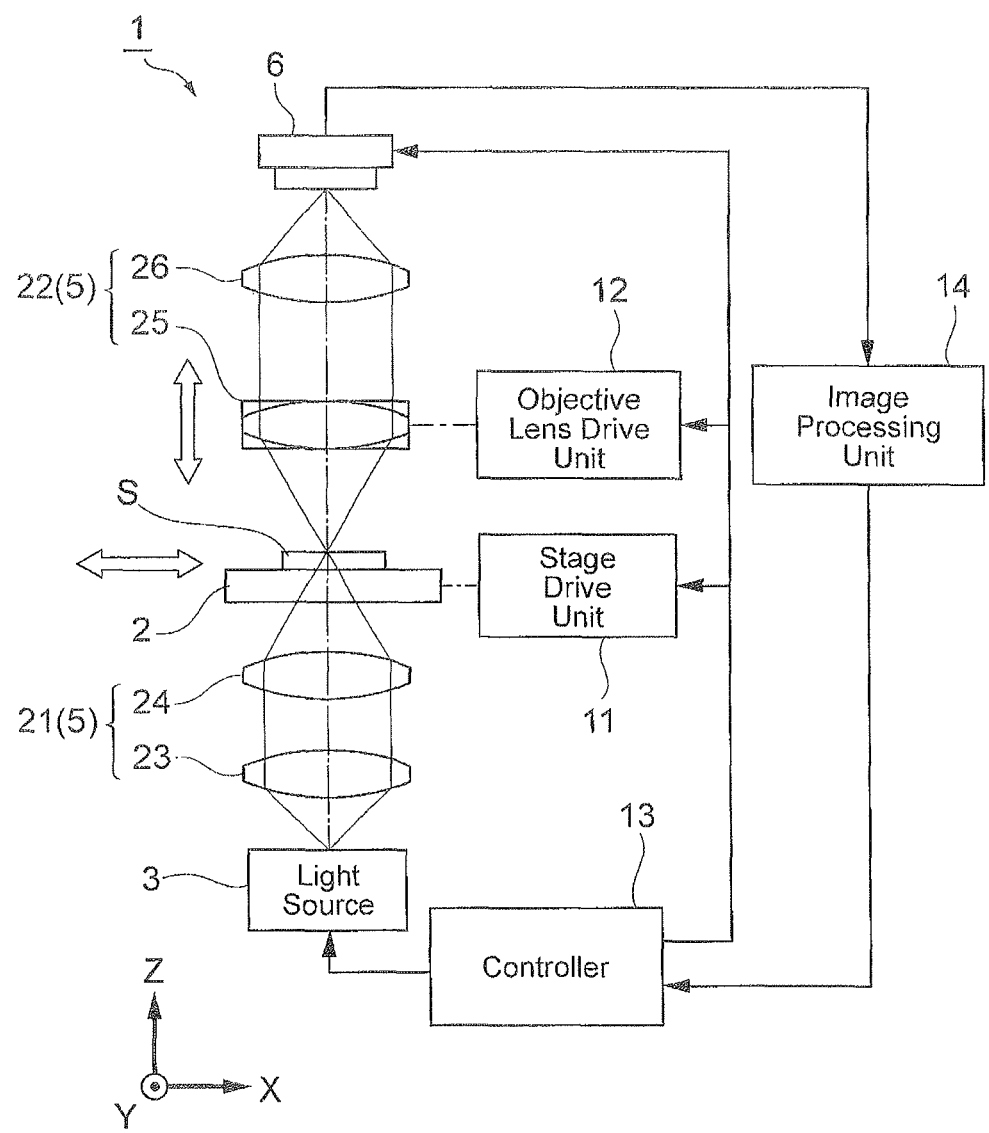
FIG. 1 is a diagram illustrating an embodiment of the image acquisition device in accordance with the present invention.

FIG. 1 is a diagram illustrating an embodiment of the image acquisition device in accordance with the present invention. As illustrated in the diagram, an image acquisition device 1 comprises a stage for mounting a sample S, a light source 3 for emitting light to the sample, a lightguide optical system 5 including an objective lens 25 arranged so as to oppose the sample S on the stage 2, and an image pickup element 6 for capturing an optical image of the sample S guided by the lightguide optical system 5.

The image acquisition device 1 also comprises a stage drive unit (first drive unit) 11 for moving a field position of the objective lens 25 with respect to the sample S, an objective lens drive unit (second drive unit) 12 for changing the focal position of the objective lens 25 with respect to the sample S, a controller 13 for controlling the image pickup element 6, stage drive unit 11, and objective lens drive unit 12, and an image processing unit 14.

The sample S to be observed by the image acquisition device 1, an example of which is a living sample such as a tissue cell, is mounted on the stage 2 while being sealed with a glass slide. The light source 3 is arranged on the bottom face side of the stage 2. For example, any of laser diodes (LD), light-emitting diodes (LED), superluminescent diodes (SLD), and light sources of lamp type such as halogen lamps is used as the light source 3.

The lightguide optical system 5 is constituted by an illumination optical system 21 arranged between the light source 3 and stage 2 and a microscope optical system 22 arranged between the stage 2 and image pickup element 6. The illumination optical system 21 has a Köhler illumination optical system constituted by a condensing lens 23 and a projection lens 24, for example, and guides the light from the light source 3 so as to irradiate the sample S with uniform light. On the other hand, the microscope optical system 22 has an objective lens 25 and an imaging lens 26 arranged on the downstream side (image pickup element 6 side) of the objective lens 25 and guides an optical image of the sample S to the image pickup element 6. The optical image of the sample S is an image formed by transmitted light in the case of bright field illumination, scattered light in the case of dark field illumination, and emission (fluorescence) in the case of emission measurement. It may also be an image formed by reflected light from the sample S.

Figure 2:
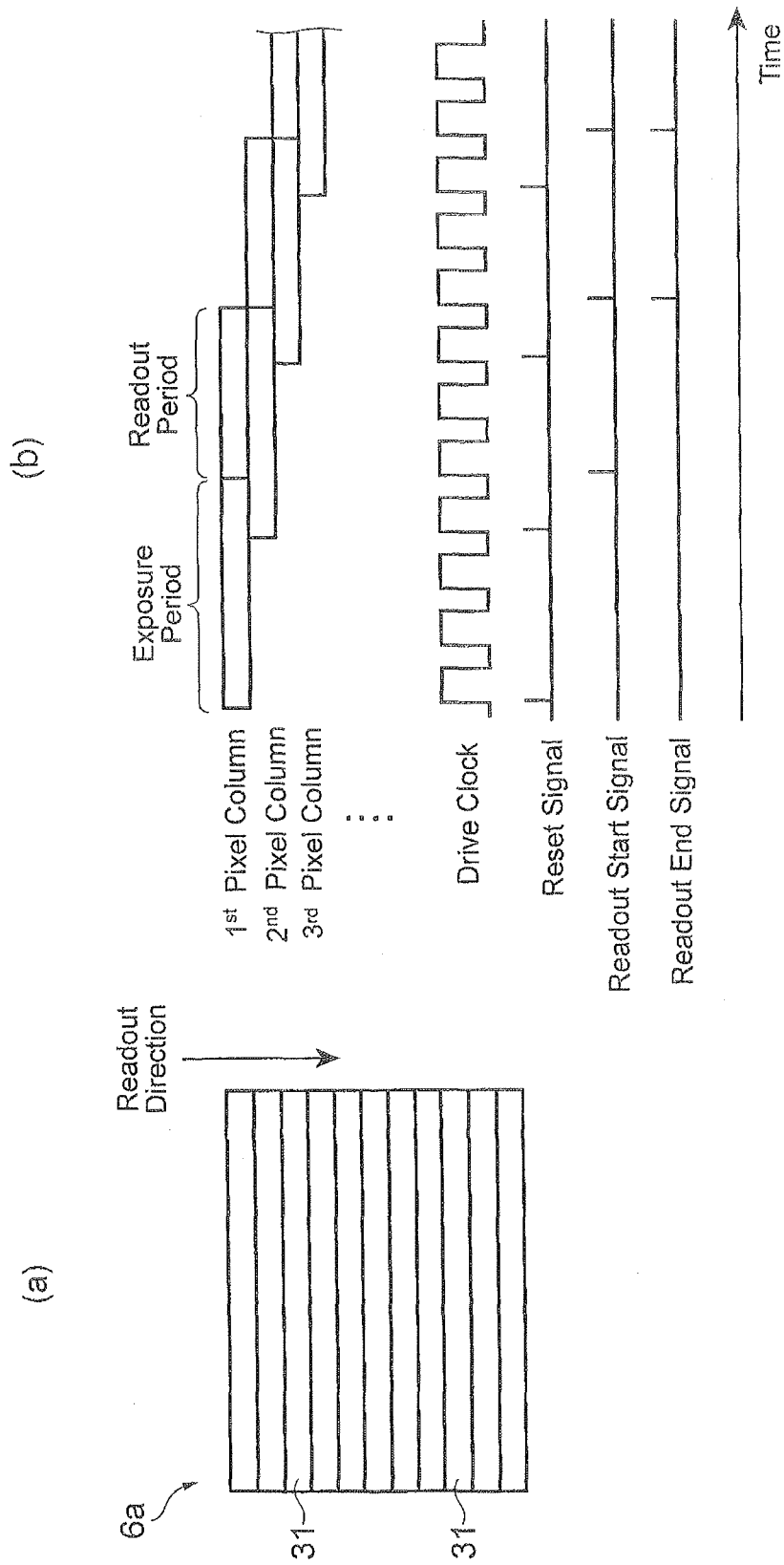
FIG. 2 is a diagram illustrating an example of an image pickup element, in which (a) and (b) represent a light-receiving surface of the image pickup element and rolling readout in the image pickup element, respectively.

The image pickup element 6 is a two-dimensional image pickup element which is adapted to perform rolling readout while having a plurality of pixel columns. An example of such an image pickup element 6 is a CMOS image sensor. As illustrated in FIG. 2(a), a plurality of pixel columns 31, each of which is constructed by arranging a plurality of pixels in a direction perpendicular to a readout direction, align in the readout direction on a light-receiving surface 6a of the image pickup element 6.

In the image pickup element 6, as illustrated in FIG. 2(b), a reset signal, a readout start signal, and a readout end signal are outputted according to a drive period of a drive clock, whereby exposure and readout are controlled for each pixel column 31. An exposure period of one pixel column 31 is a duration from discharge of electric charges triggered by the reset signal to readout of the electric charges triggered by the readout start signal. A readout period of one pixel column 31 is a duration from the start of readout of electric charges triggered by the readout start signal to an end of readout of electric charges triggered by the readout end signal. The readout start signal for the next pixel column can also be used as the readout end signal.

In the rolling readout, readout start signals to be outputted for the respective pixel columns 31 are sequentially outputted with a predetermined time difference. Therefore, unlike global readout in which all the pixel columns are read out at the same time, respective readout operations for the pixel columns 31 are sequentially performed with the predetermined time difference. The readout speed in the rolling readout is controlled by a time interval of the readout start signals for reading the respective pixel columns 31. The readout speed becomes faster and slower as the time interval of readout start signals is shorter and longer, respectively. The readout interval between the pixel columns 31, 31 adjacent to each other can be adjusted by techniques such as adjustment of the frequency of the drive clock, setting of a delay period in the readout period, and change of a clock number specifying the readout start signal, for example.

The stage drive unit 11 is constituted by a motor or actuator such as a stepping motor (pulse motor) or piezo-electric actuator, for example. Under the control of the controller 13, the stage drive unit 11 moves the stage 2 in the XY directions about a plane having a predetermined angle (e.g., 90°) with respect to a plane orthogonal to the optical axis of the objective lens 25. As a consequence, the sample S secured to the stage 2 moves relative to the optical axis of the objective lens, thereby shifting the field position of the objective lens 25 with respect to the sample S.

Figure 3:
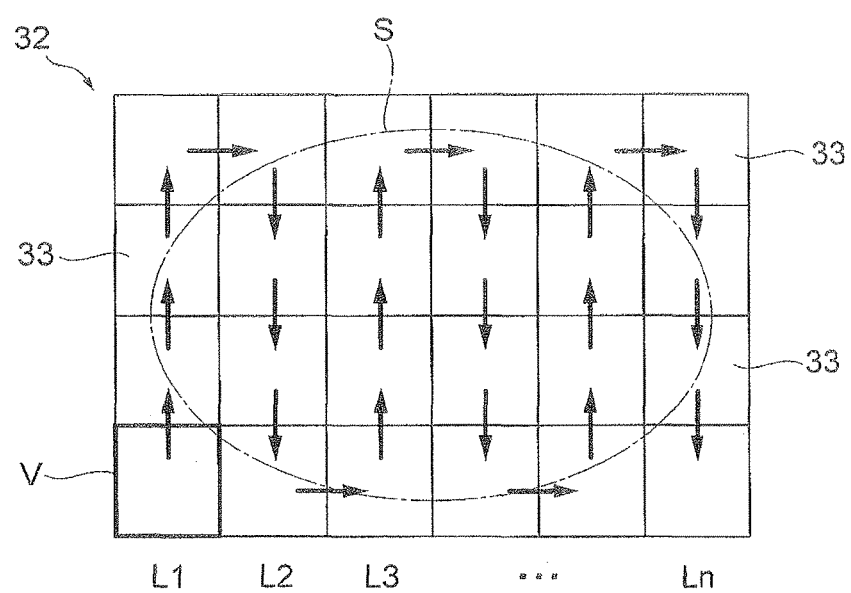
FIG. 3 is a diagram illustrating an example of scanning an image acquisition region with respect to a sample.

The image acquisition device 1 performs imaging of the sample at a high magnification of 20× to 40×, for example. Therefore, the objective lens 25 has a field V which is small with respect to the sample S, whereby a region in which an image can be captured in one imaging operation also becomes small with respect to the sample S as illustrated in FIG. 3. This makes it necessary for the field V of the objective lens 25 to be scanned with respect to the sample S in order to capture an image of the sample S as a whole.

Therefore, the image acquisition device 1 sets an image acquisition region 32 so as to include the sample S with respect to a sample container (e.g., a glass slide) holding the sample S and configures positions of a plurality of divisional regions 33 according to the image acquisition region 32 and the field V on the sample S of the objective lens 25. Then, an image of a part of the sample S corresponding to the divisional region 33 is captured, so as to acquire partial image data corresponding to the divisional region 33, and thereafter the stage drive unit 11 is driven such that the field V of the objective lens 25 is located at the next divisional region 33 to be subjected to imaging, where an image is captured again, so as to acquire partial image data. At this time, the controller 13 drives the stage drive unit 11, so as to accelerate/decelerate the stage 2 when moving the field V on the sample S of the objective lens 25 from the divisional region 33 to the next divisional region 33 and stop the stage 2 at such a position that the field V on the sample S is at the next divisional region 33. Subsequently, the image acquisition device 1 repeatedly executes this operation, whereupon the image processing unit 14 combines thus obtained partial image data, so as to produce an image of the sample S as a whole.

For capturing an image of the sample S as a whole, in the image acquisition device 1, the controller 13 controls the objective lens 25 so as to move its field position with respect to the sample S along imaging lines Ln (where n is a natural number) constituted by a plurality of divisional regions 33. At this time, the controller 13 moves the stage 2 along the scan direction such that the field V on the sample S of the objective lens 25 is located at the next divisional region 33 to be subjected to imaging. For moving the field position of the objective lens 25 with respect to the sample S between the imaging lines Ln adjacent to each other, bidirectional scanning in which scan directions are reversed between the imaging lines Ln adjacent to each other, for example, is employed as illustrated in FIG. 3. Unidirectional scanning in which the same scan direction is used for all the imaging lines Ln may be employed as well. Also employable is random scanning in which the field position of the objective lens 25 moves randomly among the divisional regions 33.

As with the stage drive unit 11, the objective lens drive unit 12 is constituted by a motor or actuator such as a stepping motor (pulse motor) or piezoelectric actuator, for example. Under the control of the controller 13, the objective lens drive unit 12 moves the objective lens 25 in the Z direction along the optical axis of the objective lens 25. This shifts the focal position of the objective lens 25 with respect to the sample S.

The controller 13 is a part which controls respective operations of the image pickup element 6, stage drive unit 11, and objective lens drive unit 12. Specifically, the controller 13 causes the objective lens drive unit 12 to change the focal position (focal plane) of the objective lens 25 with respect to the sample S. At this time, the focal position of the objective lens 25 with respect to the sample S moves along one direction. Specifically, the controller 13 causes the objective lens drive unit 12 to change the position in the Z direction of the objective lens 25 with respect to the stage 2, thereby varying the distance between the stage 2 and objective lens 25.

When the stage drive unit 11 can move the stage 2 along the Z direction aligning with the optical axis of the objective lens 25, the controller 13 may cause the stage drive unit 11 to change the position in the Z direction of the stage 2 with respect to the objective lens 25, thereby varying the distance between the stage 2 and objective lens 25. In this case, the stage drive unit 11 serves as a drive unit for moving the focal position of the objective lens 25 with respect to the sample S, thereby fulfilling functions equivalent to those of this embodiment.

The controller 13 also synchronizes movement of a predetermined part of the sample within the field V of the objective lens 25 caused by the stage drive unit 11 with the rolling readout of the image pickup element 6 such that each pixel column 31 of the image pickup element 6 is exposed (receives) an optical image of the predetermined part in the sample S. For example, the movement of the stage 2 caused by the stage drive unit 11 is synchronized with the rolling readout of the image pickup element 6. When the objective lens drive unit 12 can move the lightguide optical system 5 including the objective lens 25 in the XY directions, the controller 13 may synchronize the movement of the predetermined part of the sample within the field V of the objective lens 25 caused by the objective lens drive unit 12 with the rolling readout of the image pickup element 6 such that each pixel column 31 of the image pickup element 6 is exposed to (receives) the optical image of the predetermined part in the sample S. In this case, the objective lens drive unit 12 serves as a drive unit for moving the field position of the objective lens 25 with respect to the sample S, thereby fulfilling functions equivalent to those of this embodiment.

This embodiment employs a dynamic prefocus scheme in which focus information of the sample S in the next divisional region 33 to be subjected to imaging is acquired immediately before imaging. In this embodiment, the focus information can be acquired while moving the field position of the objective lens 25 to the next divisional region to be subjected to imaging, whereby the sample S can be placed at an in-focus position at the time when the field V of the objective lens 25 is located at the next divisional region 33 to be subjected to imaging. Therefore, the imaging of the sample S can be executed rapidly.

Figure 4:
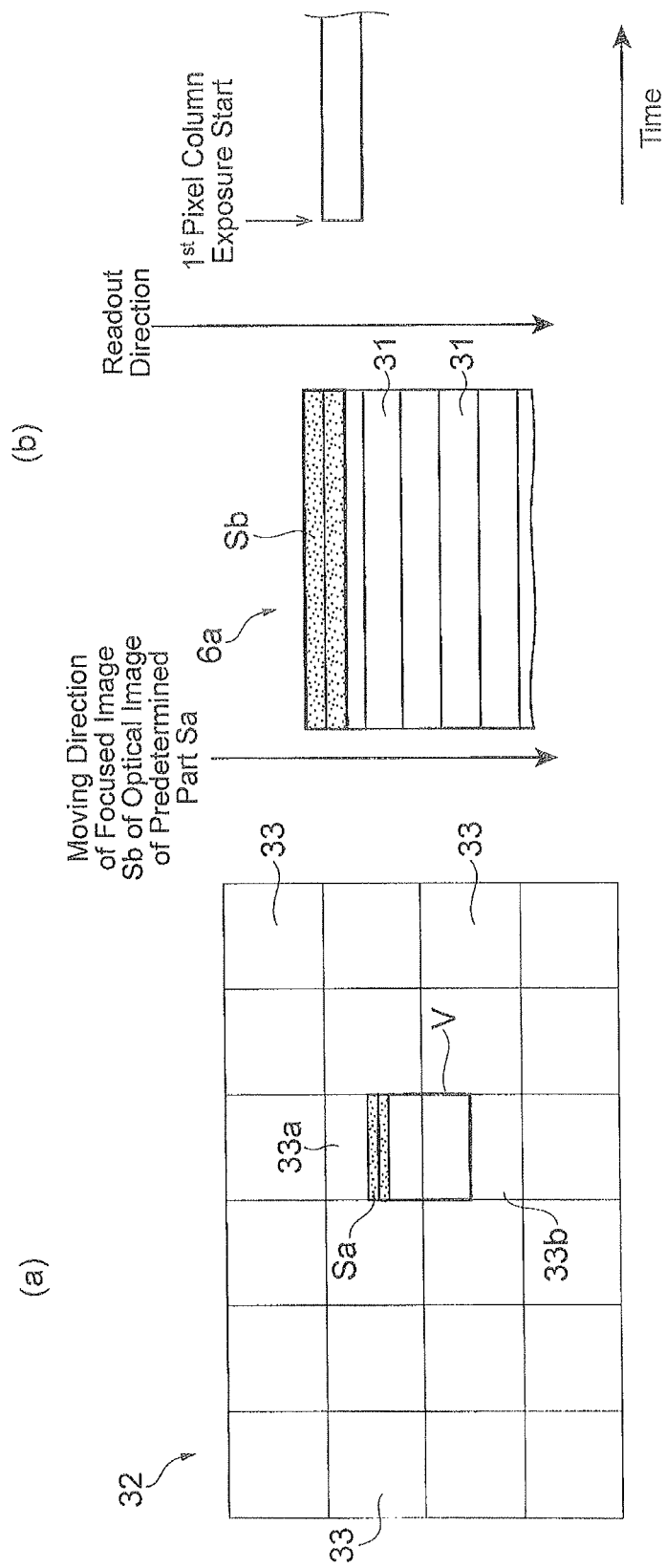
FIG. 4 is a diagram illustrating how movement of a predetermined part of the sample within a field of an objective lens is synchronized with the rolling readout of an image pickup element 6, in which (a) represents the positional relationship between the field of the objective lens and divisional regions, while (b) exhibits the predetermined part of the sample with respect to each pixel column and timings at which the image pickup element is exposed and read out.

As illustrated in FIG. 4(a), the controller 13 controls the stage drive unit 11 such that the sample S moves at a fixed speed within the field V of the objective lens 25 when the field V of the objective lens 25 shifts from one divisional region 33a to the next divisional region 33b. As illustrated in FIG. 4(b), the controller 13 also controls the stage drive unit 11 and image pickup element 6 such that the moving direction of a focused image Sb of the optical image of the sample S on the light-receiving surface 6a of the image pickup element 6 and the readout direction of each pixel column 31 of the image pickup element 6 coincide with each other. When an image pickup element which can variably set the readout speed for the rolling readout is used, the controller 13 may change the readout speed for the rolling readout according to the moving speed of the sample S within the field V of the objective lens 25.

The position of a predetermined part Sa of the sample S used for acquiring focus information can be set according to a time from the start of movement of the field V of the objective lens 25 with respect to the sample S to the start of exposure of the pixel column 31. When the predetermined part Sa is located at any position in the divisional region 33, the controller 13 outputs a reset signal for starting exposure to the image pickup element 6 such as to start the exposure of the pixel column 31 after a lapse of a predetermined time since the field V of the objective lens 25 is moved. When the predetermined part Sa is set at a specific position of the divisional region 33, the controller 13 calculates the time from the start of movement of the field V of the objective lens 25 with respect to the sample S to the start of exposure of the pixel column 31 according to the position of the predetermined part Sa in the divisional region 33 and the moving speed (or acceleration of movement) of the sample S within the field V of the objective lens 25. Then, the controller 13 starts the exposure of the pixel column 31 after a lapse of the calculated time from the start of movement of the field V.

For example, there is a case where it is preferable for the predetermined part Sa of the sample S to be set in a region other than the end parts of the divisional regions 33 (regions abutting on boundaries of the divisional regions 33). In this case, the predetermined part Sa of the sample S is set so as to keep away from the boundaries of the divisional regions 33, whereby the start of exposure of the pixel column 31 is controlled according to the position of a region other than the end parts of the divisional region (regions abutting on the boundaries of the divisional regions 33) and the moving speed (or acceleration of movement) of the sample S within the field V of the objective lens 25.

The exposure time in each pixel column 31 is set according to at least the width of the predetermined part Sa of the sample S in the scan direction and the moving speed of the predetermined part Sa of the sample S within the field V of the objective lens 25. More preferably, the magnification of the lightguide optical system 5 is also taken into consideration. This enables each pixel column 31 to be exposed to the optical image of the predetermined part Sa of the sample S.

Here, when the focused image Sb of light from the predetermined part Sa of the sample S on the light-receiving surface 6a of the image pickup element 6 reaches the first pixel column 31 at time T1 as illustrated in FIG. 4(b), the exposure of the first pixel column 31 is started.

Figure 5:
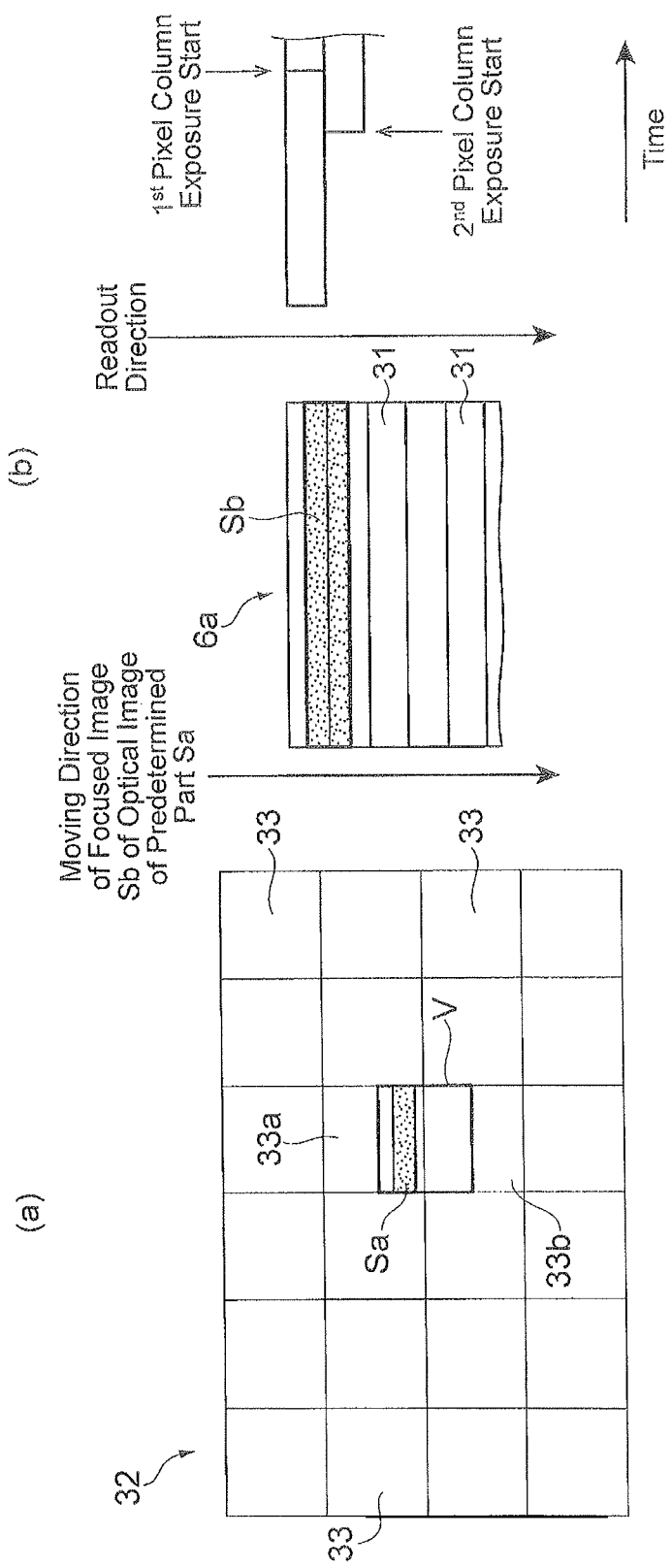
FIG. 5 is a diagram illustrating a state subsequent to FIG. 4.

At time T2, the position of the sample S within the field V of the objective lens 25 shifts as illustrated in FIG. 5(a). The focal position of the objective lens 25 also changes as compared to that at the time T1 in such a direction that the gap between the sample S and objective lens 25 becomes narrower, for example. The focal position of the objective lens 25 with respect to the sample S moves along one direction. At this time, as illustrated in FIG. 5(b), the focused image Sb of light from the predetermined part Sa of the sample S reaches the second pixel column 31, thereby starting exposure of the second pixel column 31. The readout of the first pixel column 31 is started at the timing when the focused image Sb of light from the predetermined part Sa of the sample S passes through the first pixel column 31.

Figure 6:
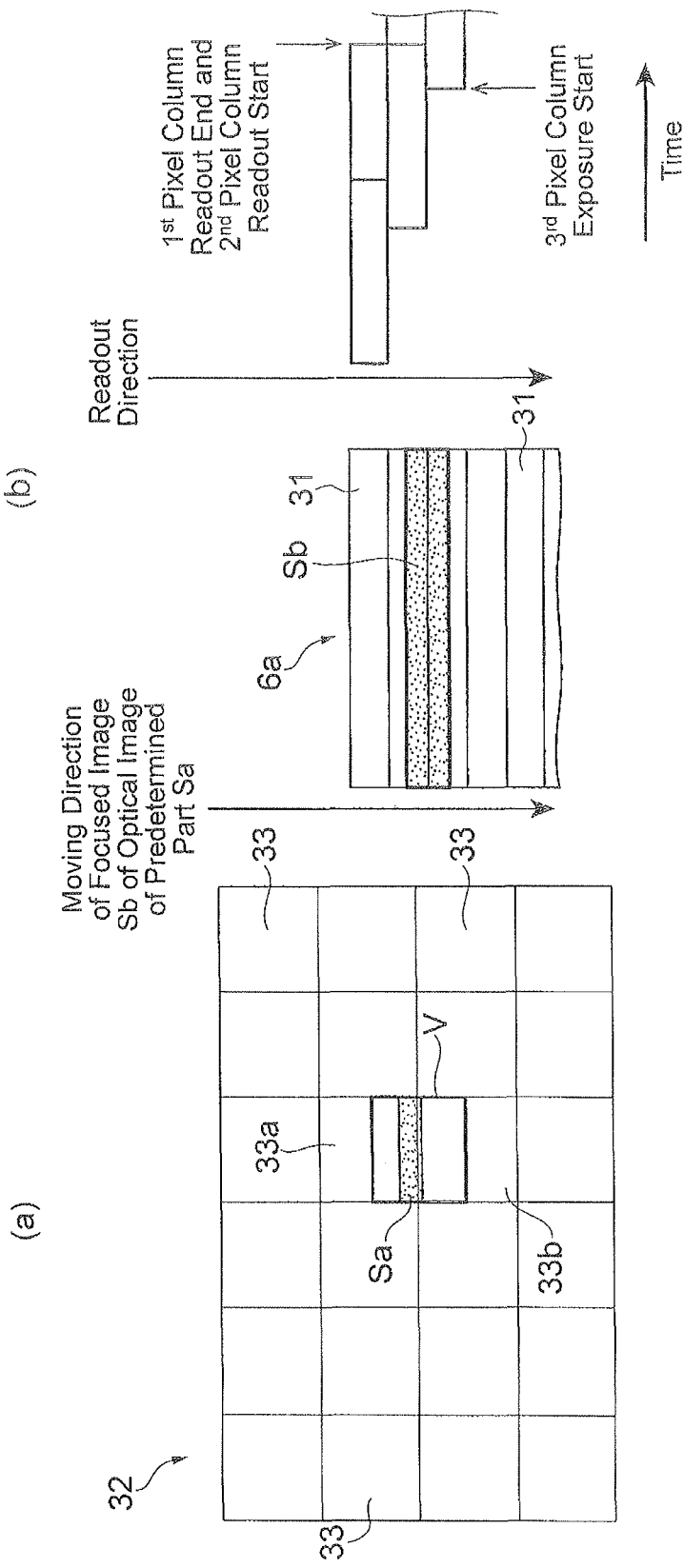
FIG. 6 is a diagram illustrating a state subsequent to FIG. 5.

At time T3, the position of the sample S within the field V of the objective lens 25 further shifts in the scan direction as illustrated in FIG. 6(a). The focal position of the objective lens 25 also changes as compared to that at the time T1 in such a direction that the gap between the sample S and objective lens 25 becomes narrower. At this time, as illustrated in FIG. 6(b), the focused image Sb of light from the predetermined part Sa of the sample S reaches the third pixel column 31, thereby starting exposure of the third pixel column 31. The readout of the second pixel column 31 is started at the timing when the focused image Sb of light from the predetermined part Sa of the sample S passes through the second pixel column 31. The readout of the first pixel column 31 ends at the same time when the readout of the second pixel column 31 is started.

Subsequently, the movement of the predetermined part Sa of the sample S within the field V of the objective lens 25 and the rolling readout at the pixel column 31 are performed in the same procedure until a predetermined number of pixel columns is reached. Respective image data read out from the pixel columns 31 are sequentially outputted to the image processing unit 14. It is preferable for the image pickup element 6 to be able to switch readout directions of the rolling readout. This makes it easy for the moving direction of the focused image Sb of light from the sample S and the readout direction of each pixel column 31 of the image pickup element 6 to coincide with each other even when the scan direction of the field position of the objective lens 25 with respect to the sample S changes as in bidirectional scanning and random scanning.

Figure 7:
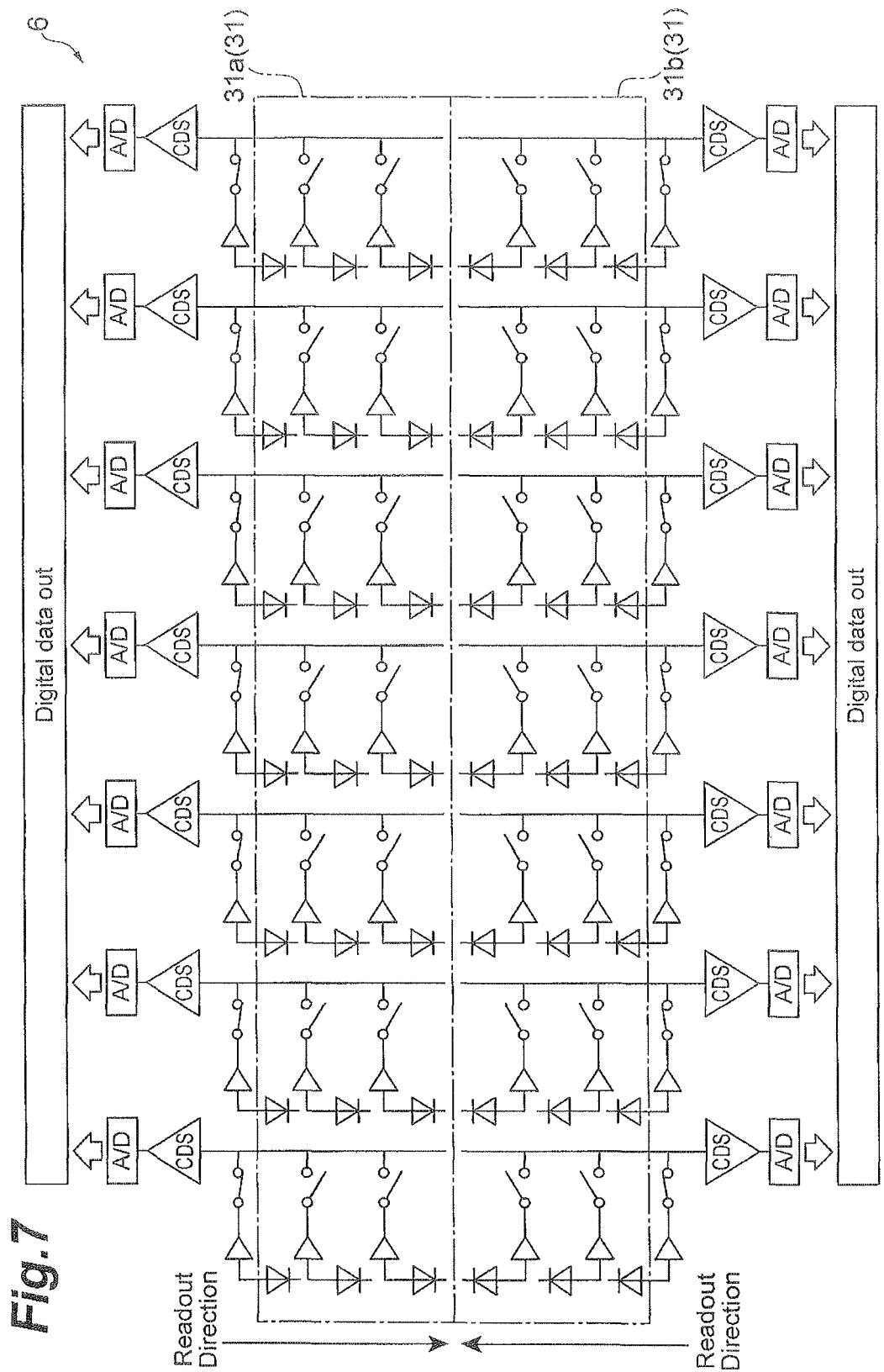
FIG. 7 is a diagram illustrating an example of pixel column configurations in the image pickup element.

As illustrated in FIG. 7, a plurality of pixel columns 31 constructing the light-receiving surface 6a of the image pickup element 6 may be separated into first and second pixel column groups 31a, 31b, each constituted by a plurality of pixel columns, the first and second pixel column groups 31a, 31b being read out separately from each other. In this case, the readout direction of the first pixel column group 31a and the readout direction of the second pixel column group 31b may be set opposite to each other, and the pixel column group used for acquiring focus information may be selected according to the scan direction. Specifically, the first pixel column group 31a is controlled such that pixel groups are sequentially read out from those at an end to those at the center, and the second pixel column group 31b is also controlled such that pixel groups are sequentially read out from those at an end to those at the center. Of course, the first pixel column group 31a may be controlled such that pixel groups are sequentially read out from those at the center to those at an end, and the second pixel column group 31b may also be controlled such that pixel groups are sequentially read out from those at the center to those at an end. This can adapt to bidirectional scanning. The first pixel column group 31a may be controlled such that pixel groups are sequentially read out from those at an end to those at the center, while the second pixel column group 31b may be controlled such that pixel groups are sequentially read out from those at the center to those at an end. In this case, the first and second pixel groups 31a, 31b are exposed to (receive) optical images of different sample positions, whereby focus information can be obtained at two positions at the same time. In bidirectional scanning, it is preferable for the first and second pixel groups 31a, 31b to have readout directions opposite to each other.

The image processing unit 14 is a part which combines partial image data captured by the image pickup element 6, so as to generate an observation image of the sample S. The image processing unit 14 sequentially receives the respective partial image data of the divisional regions 33 outputted from the image pickup element 6 and combines them, so as to generate an observation image of the sample S as a whole.

The image processing unit 14 also functions as a focus calculation unit which calculates focus information of the sample S according to image data from the image pickup element 6. Specifically, the image processing unit 14 calculates the focus information of the sample S according to the respective image data from the pixel columns 31 of the image pickup element 6. An example of the focus information is such positional information in the Z direction of the objective lens 25 or stage 2 that the sample S is located at the focal position of the objective lens 25. Examples of such information include the position in the Z direction of the objective lens 25, the height (distance) of the objective lens 25 with respect to the sample S (stage 2), the position in the Z direction of the stage 2, and the height (distance) of the sample S (stage 2) with respect to the objective lens 25.

As mentioned above, the controller 13 synchronizes the movement of the predetermined part Sa of the sample S within the field V of the objective lens 25 caused by the stage drive unit 11 with the rolling readout of the image pickup element 6 such that each pixel column 31 of the image pickup element 6 is exposed to an optical image of the predetermined part Sa in the sample S, while causing the objective lens drive unit 12 to change the focal position of the objective lens 25. Therefore, in order for each pixel column 31 to be exposed to the optical image of the predetermined part Sa of the sample S, the image data from the image pickup element 6 obtained when the focal position is acquired includes contrast information at the time when the focal position of the objective lens 25 is changed at the predetermined part Sa (the same part) of the sample S.

Figure 8:
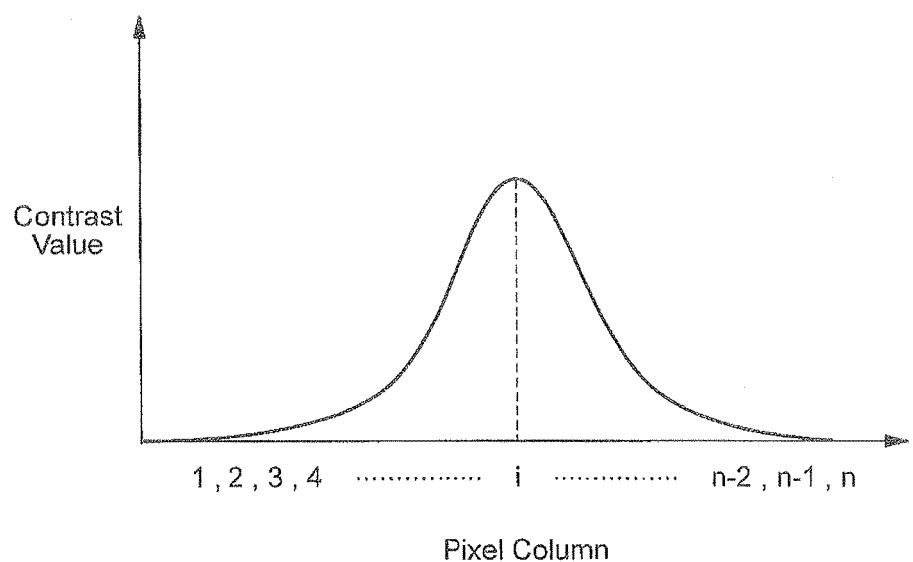
FIG. 8 is a diagram illustrating an example of contrast information processed by an image processing unit.

FIG. 8 is a diagram illustrating an example of contrast information processed by the image processing unit. The example illustrated in the diagram represents contrast values of image data from the first pixel column 31 to the $n^{th}$ pixel column 31 in the imaging region, in which the contrast value of the image data in the $i^{th}$ pixel column 31 is a peak value. In this case, assuming that the focal position of the objective lens 25 is an in-focus position when exposing the $i^{th}$ pixel column to the predetermined part Sa of the sample S, the image processing unit 14 generates focus information. As the contrast value, the contrast value in a specific pixel in the pixels included in each pixel column 31 or an average value of contrast values in part or whole of the pixels included in each pixel column 31 may be used.

Figure 9:
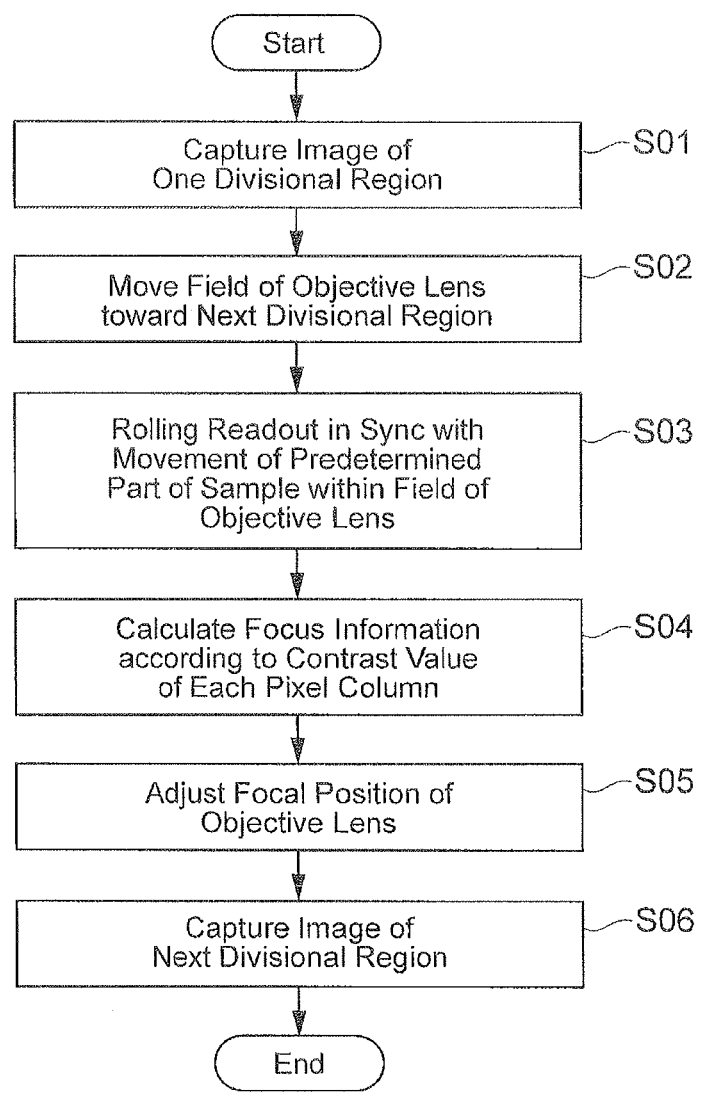
FIG. 9 is a flowchart illustrating operations of the image acquisition device represented in FIG. 1.
Figure 10:
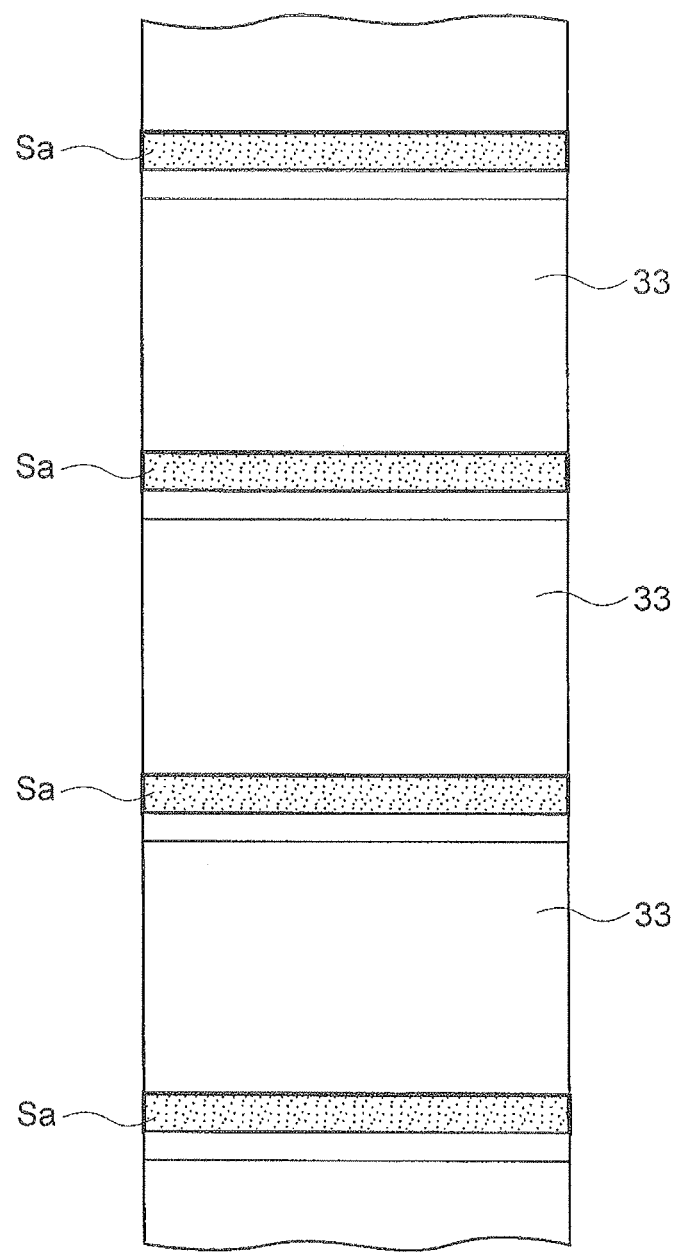
FIG. 10 is a diagram illustrating the relationship between divisional regions and the predetermined part of the sample when producing a focus map.

Operations of the above-mentioned image acquisition device 1 will now be explained. FIG. 9 is a flowchart illustrating the operations of the image acquisition device.

In the image acquisition device 1 employing the dynamic prefocus scheme, an image of the sample S is captured in one divisional region 33 (step S01), whereupon the field V of the objective lens 25 moves toward the next divisional region 33 (step S02). Next, while the focal position of the objective lens 25 is changed during the movement of the field V of the objective lens 25, the movement of the predetermined part Sa of the sample S within the field V of the objective lens 25 is synchronized with the rolling readout of the image pickup element 6 such that each pixel column 31 of the image pickup element 6 is exposed to an optical image of the predetermined part Sa in the sample S after a lapse of a predetermined time (step S03).

After completing the readout of image data at a predetermined pixel column 31, focus information is calculated according to respective contrast values of image data in the pixel columns (step S04). Then, the focal position of the objective lens 25 with respect to the sample S is adjusted according to the calculated focus information, and an image of the sample S is captured in the next divisional region 33 after the field V of the objective lens 25 is located there (step S05). The processing of steps S01 to S05 is repeated until the imaging of the sample S is completed in all the divisional regions 33, whereupon the respective images of the divisional regions 33 are combined, so as to generate an observation image of the sample S as a whole.

As explained in the foregoing, the image acquisition device 1 uses as the image pickup element 6 a two-dimensional image pickup element which is adapted to perform rolling readout while having a plurality of pixel columns 31. The rolling readout scheme, which varies image data readout timings among the pixel columns 31 and thus may distort images when used for movable objects, is typically employed for objects which stand still. In contrast, by utilizing a delay in image data readout timings among the pixel columns 31 in the rolling readout, the image acquisition device 1 synchronizes the movement of the predetermined part Sa (the same part) of the sample S within the field V of the objective lens 25 with the rolling readout such that each pixel column 31 of the image pickup element 6 is exposed to an optical image of the predetermined part Sa in the sample S, while changing the focal position of the objective lens 25. As a consequence, image data from each pixel column 31 includes contrast information obtained when the focal position of the objective lens 25 is changed in the same part of the sample S, whereby the focus information can be calculated rapidly and accurately according to the contrast information.

The image acquisition device 1 also controls the stage drive unit 11 such that the predetermined part Sa of the sample S is moved at a fixed speed within the field V of the objective lens 25. This can easily control the synchronization of the movement of the predetermined part Sa of the sample S within the field V of the objective lens 25 with the rolling readout.

The predetermined part Sa of the sample S is set so as to be located in a region other than end parts of the divisional regions 33 in the image acquisition region 32 of the image pickup element 6. When set in an end part of the divisional regions 32, the predetermined part Sa of the sample S is more susceptible to acceleration at the time of being moved by the stage drive unit 11. Therefore, setting the predetermined part Sa of the sample S in a region other than end parts of the divisional regions 33 makes it possible to control the synchronization of the movement of the predetermined part Sa of the sample S within the field V of the objective lens 25 with the rolling readout more easily.

The present invention is not limited to the above-mentioned embodiment. For example, while the above-mentioned embodiment assumes to control the objective lens drive unit 12 so as to move the focal position of the objective lens 25 in one of ascending and descending directions during the synchronization of the predetermined part Sa of the sample S with the rolling readout of the image pickup element 6, the objective lens drive unit 12 may be controlled so as to reciprocate the focal position of the objective lens in ascending and descending directions. In this case, the distance (gap) in the Z direction between the objective lens 25 and stage 2 is controlled so as to expand and contract repeatedly.

When the sample S is a tissue cell, its thickness is about 10 μm, for example. Therefore, when the moving distance of the focal position of the objective lens 25 for each pixel column 31 is set to about 0.1 μm, contrast information can be acquired for the total thickness of the sample S by about 100 pixel columns. In contrast, a two-dimensional image pickup element such as a CMOS image sensor has about several thousands of pixel columns, for example, whereby contrast information can be acquired a plurality of times during one frame. Consequently, by reciprocating the objective lens 25 in the height direction, focus information can be calculated for a plurality of predetermined regions of the sample S, which makes it possible to calculate focus information more accurately.

Though the above-mentioned embodiment uses the dynamic prefocus scheme, a focus map scheme can also be employed. While the dynamic prefocus scheme acquires focus information between imaging of one divisional region 33 and imaging of the next divisional region 33, the focus map scheme acquires focus information in each divisional region 33 for the image acquisition region 32 or imaging line Ln before capturing an image of the sample S.

In this case, the controller 13 controls the stage drive unit 11 such that the field V of the objective lens 25 moves at a fixed speed over a plurality of divisional regions 33. At this time, the moving direction of the focused image Sb of light from a predetermined position of the sample S and the readout direction of the image pickup element 6 are made to coincide with each other on the light-receiving surface 6a of the image pickup element 6. At the timing when the readout of one frame ends, the readout of the next frame is started, which enables the predetermined part Sa of the sample S used for calculating the focus information to appear at fixed intervals, whereby at least one piece of focus information can be acquired in each divisional region 33. A focus map of the imaging line Ln or the sample S as a whole can be produced accurately by applying the method of least squares or the like to the focus information in each divisional region 33.

Figure 11:
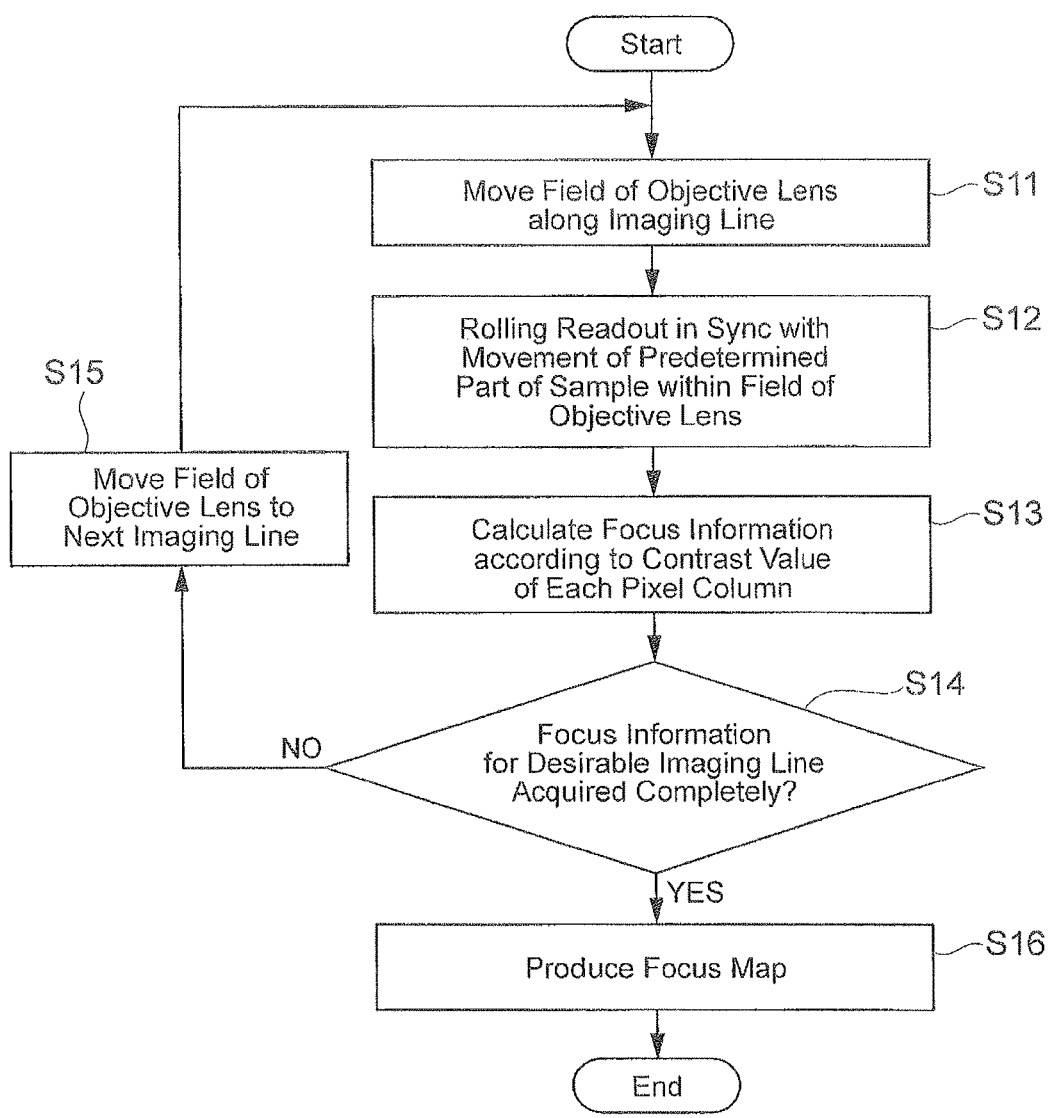
FIG. 11 is a flowchart illustrating operations of the image acquisition device when producing the focus map.

FIG. 11 is a flowchart illustrating operations of the image acquisition device when producing a focus map. In the image acquisition device 1 employing the focus map scheme, as illustrated the chart, the stage drive unit 11 starts moving the stage 2, whereupon the field V of the objective lens 25 moves over a plurality of divisional regions 33 (step S11). It also synchronizes the movement of the predetermined part Sa of the sample S with the rolling readout of the image pickup element 6 such that each pixel column 31 of the image pickup element 6 is exposed to the focused image Sb of light of the predetermined part Sa in the sample S, while changing the focal position of the objective lens 25 so as to reciprocate it along the Z direction (step S12), and calculates focus information in each divisional region 33 (step S13).

Thereafter, it is determined whether or not the calculation of focus information is completely acquired for a desirable imaging line Ln (step S14); when the calculation of focus information is not completely acquired, the field V of the objective lens 25 is moved to the next imaging line Ln (step S15), and the processing of steps S01 to S03 is repeatedly executed. When the calculation of focus information is completely acquired, a focus map of the sample S is produced according to the focus information (step S16). Then, the image data of each divisional region 33 is acquired while locating the focal position of the objective lens 25 at the sample S according to the produced focus map.

After focus information for one imaging line Ln is acquired, a focus map for this imaging line Ln may be produced, and the respective image data of the divisional regions 33 constituting the imaging line Ln may be acquired while locating the focal position of the objective lens 25 at the sample S according to the produced focus map. The focus map may be constituted by the focus information in each divisional region 33 itself instead of being produced by applying the method of least squares or the like to the focus information in each divisional region 33.

REFERENCE SIGNS LIST

1: image acquisition device; 2: stage; 3: light source; 5: lightguide optical system; 6: image pickup element; 11: stage drive unit (first drive unit); 12: objective lens drive unit (second drive unit); 13: controller; 14: image processing unit (focus calculation unit); 25: objective lens; 31: pixel column; 32: image acquisition region; 33: divisional region; S: sample; Sa: predetermined part of the sample; V: objective lens field.

The invention claimed is:

1. An apparatus for capturing an image comprising:
a stage configured to support a sample;
a light source configured to emit light to the sample;
an objective lens configured to face to the sample;
a two-dimensional image sensor including a plurality of pixel columns and configured to capture an optical image of the sample and perform rolling readout of an image sensor, wherein the image sensor comprises a plurality of pixel columns arranged in a direction perpendicular to a readout direction;
one or more processors configured to perform operations comprising:
calculating focus information of the sample according to image data from the image sensor; and
generating a focus map of the sample according to the focus information;
a first motor or actuator configured to move a field position of the objective lens with respect to the sample;
a second motor or actuator configured to change a focal position of the objective lens with respect to the sample; and
a controller configured to:
control the image sensor, first motor or actuator, and second motor or actuator;
synchronize movement of a predetermined part of the sample within a field of the objective lens caused by the first motor or actuator with the rolling readout of the image sensor such that each of the plurality of pixel columns of the image sensor is sequentially exposed to an optical image of the predetermined part in the sample with a predetermined time difference to acquire image data as each line of the optical image is scanned to adjust focus, while causing the second motor or actuator to change the focal position of the objective lens with respect to the sample, such that an exposure period for one of the plurality of pixel columns of the image sensor overlaps with a portion of an exposure period for a second of the plurality of pixel columns of the image sensor based upon the predetermined time difference; and
control the first motor or actuator such that the predetermined part of the sample is moved at a fixed moving speed within the field of the objective lens; and
wherein a rolling readout speed in the rolling readout is controlled by a time interval of readout start signals for reading respective pixel columns, and
the moving speed of the predetermined part of the sample within the field of the objective lens is synchronized with the rolling readout speed of the image sensor.

2. The apparatus according to claim 1, wherein the controller starts exposing each pixel column of the image sensor after a lapse of the predetermined time since the first motor or actuator starts moving the field position of the objective lens with respect to the sample.

3. The apparatus according to claim 1, wherein a plurality of divisional regions where the image sensor performs imaging are set; and
wherein the predetermined part of the sample is set so as to be located in a region other than end parts of the divisional regions.

4. The apparatus according to claim 3, wherein the calculator calculates the focus information when the first motor or actuator moves the field position of the objective lens between the divisional regions.

5. The apparatus according to claim 3, wherein the controller controls the first motor or actuator such that the field position of the objective lens is moved with respect to the sample over at least three divisional regions.

6. The apparatus according to claim 3, wherein the calculator calculates the focus information for each of the divisional regions.

7. The apparatus according to claim 1, wherein the image sensor is adapted to switch readout directions of the rolling readout.

8. The apparatus according to claim 1, wherein each pixel column of the image sensor is constituted by first and second column groups having respective readout directions different from each other.

9. The apparatus according to claim 1, wherein the controller controls the second motor or actuator such that the focal position of the objective lens with respect to the sample reciprocates in ascending and descending directions during the synchronization of the movement of the predetermined part of the sample with the rolling readout of the image sensor.

10. The apparatus according to claim 1, wherein the calculator generates a focus map according to the calculated focus information.

11. A method for acquiring focus information of a sample by using a two-dimensional image sensor, adapted to perform rolling readout, including a plurality of pixel columns; the method comprising:
    calculating focus information of the sample according to image data from the image sensor;
    generating a focus map of the sample according to the focus information;
    to adjust focus, synchronizing movement of a predetermined part of the sample within a field of an objective lens with the rolling readout of the image sensor such that each of the plurality of pixel columns of the image sensor is sequentially exposed to an optical image of the predetermined part in the sample with a predetermined time difference to acquire image data as each line of the optical image is scanned, while changing a focal position of the objective lens with respect to the sample, such that an exposure period for one of the plurality of pixel columns of the image sensor overlaps with a portion of an exposure period for a second of the plurality of pixel columns of the image sensor based upon the predetermined time difference; and
    acquiring the focus information of the sample according to image data from the image sensor;
    wherein the predetermined part of the sample is moved at a fixed moving speed within the field of the objective lens;
    wherein a rolling readout speed in the rolling readout is controlled by a time interval of readout start signals for reading respective pixel columns, and
    the moving speed of the predetermined part of the sample within the field of the objective lens is synchronized with the rolling readout speed of the image sensor.

12. A system for acquiring focus information comprising:
    a stage configured to support a sample;
    an objective lens configured to face to the sample;
    a two-dimensional image sensor including a plurality of pixel columns and configured to perform rolling readout and capture an optical image of the sample and perform rolling readout of an image sensor, wherein the image sensor comprises a plurality of pixel columns arranged in a direction perpendicular to a readout direction; and
    one or more processors configured to perform operations comprising:
        calculating focus information of the sample according to image data from the image sensor; and
        generating a focus map of the sample according to the focus information;
    wherein to adjust focus the system synchronizes movement of a predetermined part of the sample within a field of the objective lens with the rolling readout of the image sensor such that each of the plurality of pixel columns of the image sensor is sequentially exposed to an optical image of the predetermined part in the sample with a predetermined time difference to acquire image data as each line of the optical image is scanned, while changing a focal position of the objective lens with respect to the sample, such that an exposure period for one of the plurality of pixel columns of the image sensor overlaps with a portion of an exposure period for a second of the plurality of pixel columns of the image sensor based upon the predetermined time difference;
    wherein the predetermined part of the sample is moved at a fixed moving speed within the field of the objective lens;
    wherein a rolling readout speed in the rolling readout is controlled by a time interval of readout start signals for reading respective pixel columns, and
    the moving speed of the predetermined part of the sample within the field of the objective lens is synchronized with the rolling readout speed of the image sensor.

* * * * *